United States Patent
Murphy et al.

(10) Patent No.: US 12,519,758 B2
(45) Date of Patent: Jan. 6, 2026

(54) PERSONAL INFORMATION DATA RIGHTS REQUEST MANAGEMENT

(71) Applicant: T-Mobile USA, Inc., Bellevue, WA (US)

(72) Inventors: Zachery K. Murphy, Bellevue, WA (US); Paul M. Kvamme, Bellevue, WA (US); Megan Elizabeth McFeely, Bellevue, WA (US); Gireesh Sadasivan, Seattle, WA (US); Ranjith Krishnamoorthy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1037 days.

(21) Appl. No.: 17/127,238

(22) Filed: Dec. 18, 2020

(65) Prior Publication Data

US 2021/0194857 A1 Jun. 24, 2021

Related U.S. Application Data

(60) Provisional application No. 62/949,635, filed on Dec. 18, 2019.

(51) Int. Cl.
*H04L 9/40* (2022.01)

(52) U.S. Cl.
CPC ............... *H04L 63/0428* (2013.01)

(58) Field of Classification Search
CPC ..... H04L 63/04; H04L 63/20; H04L 63/0428; H04W 12/02
USPC .......................................................... 726/26
See application file for complete search history.

(56) References Cited

U.S. PATENT DOCUMENTS

| | | | | |
|---|---|---|---|---|
| 8,463,289 B2* | 6/2013 | Shklarski | .............. | H04W 12/02 455/410 |
| 8,898,774 B2* | 11/2014 | Gianoulakis | .......... | G06F 21/577 709/224 |
| 9,280,771 B2* | 3/2016 | Barillaud | .............. | H04L 63/102 |
| 10,880,273 B2* | 12/2020 | May | ........................ | H04L 51/48 |
| 10,891,359 B2* | 1/2021 | Donovan | .............. | G06F 21/645 |
| 11,217,041 B2* | 1/2022 | Batie | ........................ | H04L 9/50 |
| 11,314,893 B2* | 4/2022 | Vladimerou | ........ | H04L 63/0428 |
| 2010/0153695 A1* | 6/2010 | Bussard | .............. | G06F 21/6245 713/1 |
| 2011/0126290 A1* | 5/2011 | Krishnamurthy | ..... | H04L 63/102 726/26 |
| 2015/0193638 A1* | 7/2015 | Cook | ..................... | G06F 16/245 726/27 |
| 2015/0213288 A1* | 7/2015 | Bilodeau | ............. | G06F 21/6254 726/26 |

(Continued)

*Primary Examiner* — Amare F Tabor
(74) *Attorney, Agent, or Firm* — Lee & Hayes, P.C.

(57) ABSTRACT

Techniques for managing personally identifiable information are discussed herein. Such personally identifiable information may be managed in a data subject rights management platform that may centrally manage policies by determining actions associated with data in response to various requests. The technique identifies what fields and tables are applicable to the request by generating and accessing a catalog of applications that includes a mapping of what data is stored in each application and how the data is processed. As policies are centrally managed, applications can be dynamically updated so that if policies change, code associated with each application does not need to be updated individually.

20 Claims, 9 Drawing Sheets

(56) References Cited

U.S. PATENT DOCUMENTS

2016/0148014 A1\* 5/2016 Peterson ............. G06F 21/6245
726/28

\* cited by examiner

PERSONAL INFORMATION DATA RIGHTS REQUEST MANAGEMENT

CROSS-REFERENCE TO RELATED APPLICATIONS

This application is a nonprovisional application of, and claims priority to and the benefit of, U.S. Patent Application Ser. No. 62/949,635, filed Dec. 18, 2019, and entitled "Personal Information Data Rights Request Management," the entirety of which is incorporated herein by reference.

BACKGROUND

Companies that provide services for users may often store data, such as personally identifiable information (PII), about the users for various reasons, such as generating user accounts, communicating with users, marketing purposes, fraud detection, etc. The users may desire access to the data and, in some cases, want the data to be deleted from the company's records. In other cases, companies may be legally required to provide access to and/or delete certain types of data based on a set of policies. The companies may store the data across multiple types of distributed platforms (e.g., applications) and/or in multiple types of formats. However, such implementations present challenges for managing data stored in this manner.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
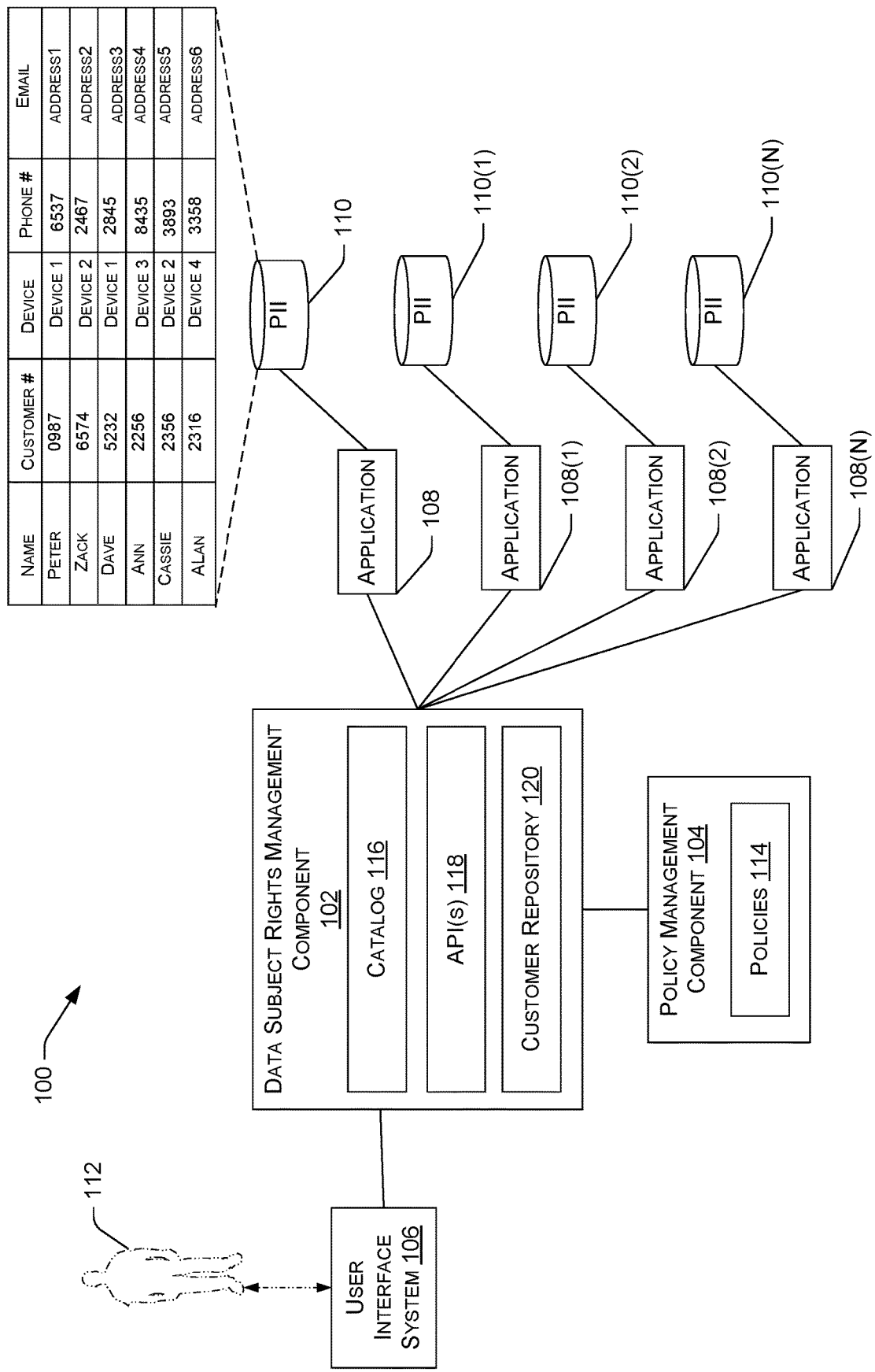
FIG. 1 illustrates an example network architecture for a telecommunications network that can provide improved access to and control of user data.

Techniques for managing personally identifiable information stored on distributed platforms are discussed herein. For example, such techniques may identify what data needs to be deleted and/or provided back in response to an access request.

Currently, if certain data needs to be accessed and/or deleted in response to a user request or a privacy policy change, a data engineer may need to access each platform (e.g., application) storing the data and manually access and/or remove the data. The data may be stored on multiple platforms, which requires the data engineer to access each platform individually leading to decreased efficiency across a network, increased load on network resources, as well as introducing the potential for incorrect or incomplete implementation due to human error.

In some examples, this disclosure describes techniques for centrally managing policies that include determining what data stored by applications needs to be deleted or provided back in an access request. The technique identifies what fields and tables are applicable to the request by generating and accessing a catalog of applications that includes a mapping of what data is stored in each application and how the data is processed and/or used. As policies are centrally managed, applications can be dynamically updated so that if policies change, each application does not need to update their code individually. This results in reduced strain on a network and improved performance of the computing devices supporting the network while maintaining compliance with privacy policies.

In some examples, a computing device associated with a data subject rights management (DSRM) platform may communicate with a policy manager component that is capable of on-boarding applications to be compatible with the DSRM platform. For example, applications operated by or in communication with a service provider, such as a telecommunications company, may store data that includes personally identifiable information (PII) associated with the various customers of the service provider. In order to maintain compliance with privacy policies implemented by government regulations, the PII may need to be deleted and/or provided access to based on a type of PII and/or what the PII is being used for. The PII may include, but is not limited to, identification numbers, driver's license number, address, birthdate, social security number, mobile phone type, location, fax number, name, Email, Mobile Station International Subscriber Directory Number (MSISDN), employer, banking information, credit history, shopping history, etc. The applications discussed herein may include any application that a service provider may use to provide service to a customer and/or manage data associated with a customer.

In some examples, the policy management component may on-board applications to be compatible with the DSRM platform. For example, the policy management component may store a number of policies that may be applied to the applications. The policies may be associated with privacy policies that correspond to government regulation. In some examples, the policy management component may identify data within an application and flag the application and/or the data based on the policies. For example, a policy stored by the policy management component may indicate certain types of data (e.g., types of PII) that need to be deleted and/or provided access to in response to a user request to do so. The policy management component may flag data including a type of PII based on one of the policies indicating that the type of PII pertains to the policy. In some examples, the policy management component may flag data based on how the application is using the data (e.g., marketing, fraud detection, billing, etc.). By way of example, a policy may require that any information relating to social security numbers be flagged in an application. If the policy management component is on-boarding an application that stores social security numbers of users, the policy management component may flag the data (e.g., social security numbers) stored by the application as being associated with the policy.

In some scenarios, the policy management component may inventory (e.g., format) the data stored by an application into tables and columns that may be mapped by the DSRM platform. The tables and columns may organize the data by data type and by use type. In some cases, a policy may require that a certain data type be deleted if being used for a first use type (e.g., non-exempt) but may be exempt from deletion if being used for a second use type. For example, the policy may require that social security information be deleted if being used for marketing purposes but may be exempt from deletion if being used for fraud detection purposes.

In some examples, the policy management component may associate an application identifier that identifies the application with a particular policy based on the application storing data associated with the policy. For example, the DSRM platform and/or the policy management component may store a catalog that includes each application identifier and which policies are associated with each application identifier. If a change to a policy is made, then the DSRM platform may access the catalog to determine which applications need to be updated based on the policy change. In some examples, the catalog stores processing activities associated with the data stored in each application at the table-level. For example, the catalog may store table information identifying the location (e.g., table number, column, etc.) of types of data and what the data is being used for.

In some scenarios, the DSRM platform may receive a request to access and/or delete data stored by an application. The request may be sent from a third-party resource that provides tools, such as a user interface, to a user attempting to access and/or delete the data. For example, the third-party resource may interface with the DSRM platform via an application programming interface (API). The third-party resource may send a request to the DSRM platform, via the API, that includes an identifier of a user making the request, a type of data to be accessed and/or deleted, and an action request (e.g., request to access the data and/or a request to delete the data from the application).

In some examples, the DSRM platform may access a customer repository to verify that the user is a customer. In some cases, the customer repository may indicate whether the user is a former customer, a current customer, and/or a prospective customer. In some scenarios, the customer repository may be part of the catalog and the DSRM platform may access the catalog to determine which applications need to be accessed and/or updated based on the request. For example, the request may indicate a particular type of data that the user desires to have access to or to be deleted.

The catalog may store a list of application identifiers that are associated with policies as well as an indication of what types of data (e.g., a data type) are being stored by the application and what the data is being used for (e.g., a use type). The DSRM platform may determine if the type of data included in the request and the user identification corresponds to one of the application identifiers stored in the catalog. In some examples, the DSRM platform may identify a column and/or table of an application storing the type of data included in the request.

In some examples, once an application is identified as storing the type of data included in the request and/or the column and/or table of the application is identified as storing the type of data included in the request, the DSRM platform may send a message to the application causing the application to delete the data and/or return the data as a response to an access request. In some cases, the message to the application identifies the type of data to delete and the location of the data within a table (e.g., table number, column, etc.). In some cases, the message may be sent to multiple different applications that each store the type of data indicated in the request. For example, the DSRM platform may operate an API that is accessible by a number of different applications that each store data associated with one or more users. The applications may each communicate with the DSRM platform to receive messages that cause the applications to provide access to types of data and/or to delete types of data.

In some embodiments, the systems, devices, and techniques described herein improve the efficiency and functionality of a network by enabling the DSRM platform to dynamically update databases based on the type of data and the type of use of data associated with the information stored in the databases. Policies applied to the applications that store the databases can define a deletion standard to be associated with certain use types of data. The deletion standard can include exempt statuses as well as non-exempt statues. Distinguishing statuses based on the type of data and the use type of certain data enables the specialization of network resources and optimized allocation of connections between the DSRM platform and applications capable of utilizing assigned network resources.

Example Utility System

FIG. 1 is a diagram illustrating an example networked environment or architecture 100 including a data subject rights management (DSRM) component 102 and a policy management component 104. The DSRM component 102 may be utilized, via a user interface system 106, to access and/or delete data stored by application 108 or other applications 108(1), 108(2), . . . 108(N) (collectively referred to as "applications 108" or "application 108"), where N is any integer greater than or equal to 1. In some examples, the DSRM component 102 and the policy management component 104 may be associated with an entity operating a telecommunication service, such as a manufacturer, vendor, supplier, or other third-party that provides, services, or administers at least a portion of a communication network.

In some examples, the DSRM component 102 may communicate with the policy management component 104 that is capable of on-boarding applications 108 to be compatible with the DSRM component 102 in order to access and/or delete data from PII database 110 or other PII databases 110(1), 110(2), . . . 110(N) (collectively referred to as "PII databases 110" or "PII database 110"), where N is any integer greater than or equal to 1. For example, applications 108 operated by or in communicating with a service provider, such as a telecommunications service that operates the DSRM component 102, may store data associated with customers, such as a user 112, in the PII databases 110. The data stored in the PII databases 110 may include, but is not limited to, any type of PII, such as identification number, driver's license number, address, birthdate, social security number, mobile phone type, location, fax number, name, Email, Mobile Station International Subscriber Directory Number (MSISDN), employer information, banking information, credit history, shopping history, etc.

In some examples, the policy management component 104 may on-board applications 108 to be compatible with the DSRM component 102. For example, the policy management component 104 may store a number of policies 114 that may be applied to the applications 108. The policies 114 may be associated with privacy policies that correspond to government regulation. In some examples, the policy management component 104 may identify data within an application 108 and flag the application 108 and/or the data based on the policies 114. For example, a policy 114 stored by the policy management component 104 may indicate types of data (e.g., types of PII) that need to be deleted and/or provided access to in response to a user request to do so. The policy management component 104 may flag data including a type of PII based on one of the policies 114 indicating that the type of PII pertains to the policy 114. In some examples, the policy management component 104 may flag data based on how the application 108 is using the data (e.g., marketing, fraud detection, billing, etc.). By way of example, a policy 114 may require that any information relating to social security numbers be flagged in an application 108. If the policy management component 104 is on-boarding an application 108 that stores social security numbers of the user 112, the policy management component 104 may flag the data (e.g., social security numbers) stored by the application 108 as being associated with the policy 114.

In some scenarios, the policy management component 104 may inventory the data stored by an application 108 into tables (e.g., data structure) and columns that may be mapped by the DSRM component 102. The tables and columns may organize the data by data type and by use type. In some cases, a policy 114 may require that a certain data type be deleted if being used for a first use type but may be exempt from deletion if being used for a second use type. For example, the policy 114 may require that social security information be deleted if being used for marketing purposes but may be exempt from deletion if being used for fraud detection purposes. By organizing the data into tables and columns, the DSRM component 102 may identify what fields and tables are applicable to a particular request.

In some examples, the policy management component 104 may associate an application identifier that identifies the application 108 with a particular policy 114 based on the PII database 110 storing data associated with the policy 114. For example, the DSRM component 102 and/or the policy management component 104 may store a catalog 116 that includes each application identifier associated with each application 108 and which policies 114 are associated with each application identifier. If a change to a policy 114 is made, then the DSRM component 102 may access the catalog 116 to determine which applications 108 need to be updated based on the policy change. In some examples, the catalog 116 stores processing activities associated with the data stored in each PII database 110 at the table-level. For example, the catalog 116 may store table information identifying the location (e.g., table number, column, etc.) of types of data and what the data is being used for.

In some scenarios, the DSRM component 102 may receive a request to access and/or delete data (e.g., a data entry and/or entry) stored by an application 108. The request (e.g., data deletion request) may be sent from a third-party resource that provides tools, such as the user interface system 106, to the user 112 attempting to access and/or delete the data. For example, the third-party resource may interface with the DSRM component 102 via an application programming interface (API) 118. The third-party resource may send a request to the DSRM component 102, via the API 118, that includes an identifier of the user 112 making the request, a type of data to be accessed and/or deleted, and an action request (e.g., request to access the data and/or a request to delete the data from the application). In some examples, the DSRM component 102 may access a customer repository 120 to verify that the user is a customer.

In some examples, verifying an identity of a user may include using multi-factor authentication. For example, the user interface system 106 may present a login screen requesting authentication information, such as a username and/or a password. In some cases, a one-time personal identification number (PIN) and/or password may be sent to the user via email, text, voicemail, etc. In some cases, the DSRM component 102 may use the authentication information provided by the user to verify that the user is a customer via the customer repository 120.

In some cases, the customer repository 120 may indicate whether the user 112 is a former customer, a current customer, and/or a prospective customer. In some scenarios, the DSRM component 102 may access the catalog 116 to determine which applications 108 need to be accessed and/or updated based on the request. For example, the request may indicate a particular type of data that the user 112 desires to have access to or to be deleted. The catalog 116 may store a list of application identifiers identifying the applications 108 that are associated with the policies 114 as well as an indication of what types of data (e.g., a data type) are being stored by the application 108 and what the data is being used for (e.g., a use type). The DSRM component 102 may determine if the type of data included in the request and the user identification corresponds to one of the application identifiers stored in the catalog 116. In some examples, the DSRM component 102 may identify a column and/or table of the PII database 110 storing the type of data included in the request.

In some examples, once a PII database 110 associated with an application 108 is identified as storing the type of data included in the request and/or the column and/or table (e.g., data structure) of the PII database 110 is identified as storing the type of data included in the request, the DSRM component 102 may send a message to the application 108 causing the application 108 to delete the data (e.g., a data entry and/or entry) and/or return the data as a response to an access request. In some cases, the message to the application 108 identifies the type of data to delete and the location of the data within a table (e.g., table number, column, etc.). In some examples, sending the message to the application 108 may include operating the APIs 118 and allowing the applications 108 to access the APIs 118 to determine which type of data to delete and the location of the data within a table. In some cases, the message may be accessed by multiple different applications 108 that each store the type of data indicated in the request. For example, the DSRM component 102 may enable the API(s) 118 to be accessible to a number of different PII database 110 associated with applications 108 that each store data associated with one or more users 112. The applications 108 may each communicate with the DSRM component 102 via the API(s) 118 to receive messages that cause the applications 108 to provide access to types of data and/or to delete types of data based on the user request and the policy 114 associated with each application 108.

In some examples, the application 108 and the application 108(1) may store the same and/or similar types of data but may not be using the data for the same purpose (e.g., use type). For example, the application 108 may store a first type of data and use it for a first use type and the application 108(1) may store the first type of data and use it for a second use type. According to one of the policies 114, the first use type may be associated with a non-exempt status regarding a deletion request and the second use type may associated with an exempt status regarding a deletion request. The same policy 114 may be applied to both of the application 108 and the application 108(1). If the DSRM component 102 receives an access request and/or a delete request for the first type of information from the user 112, the application 108 and the application 108(1) may receive the request via the APIs and the application 108 may delete the first type of data based on the non-exempt status of the first use type according to the policy 114 while the application 108(1) may refrain from deleting the first type of data based on the exempt status of the second use type according to the policy 114. In this way, each of the applications 108(1), 108(2), . . . 108(N) may automatically update (e.g., provide access to, delete, etc.) their respective PII databases 110(1), 110(2), . . . 110 (N) according to the policy rules outlined in the policies 114 without manually accessing individual applications. In some examples, the applications 108 may include software, hardware, containerized applications, computing devices and the like. In some cases, the applications 108 may include subscriptions, statues, historical transactions, associations to other services, purchases, marketing demographics, invoices, billing, credit, configurations, service records, legal contracts, etc.

Figure 2:
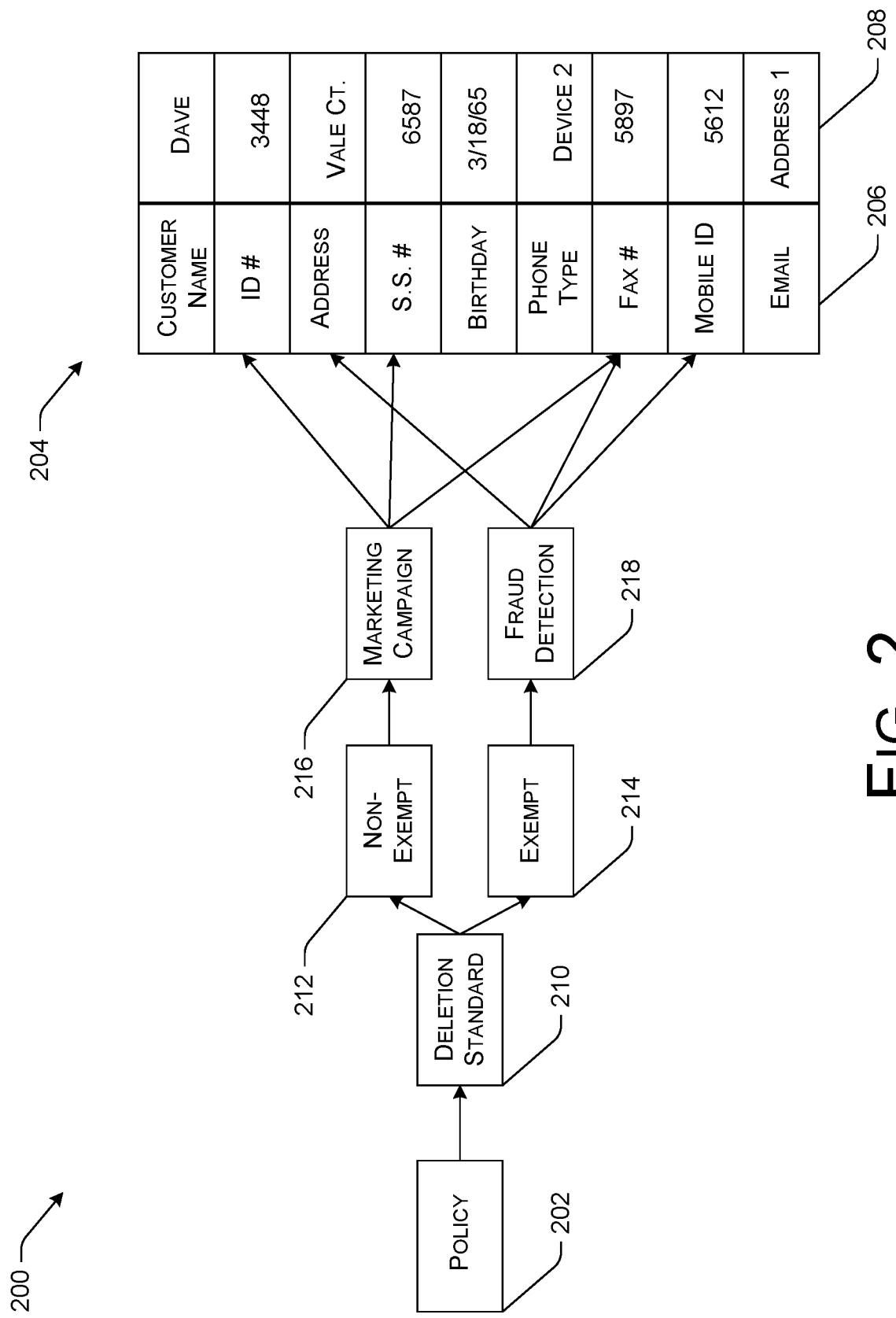
FIG. 2 illustrates a mapping process for determining data that may be deleted from a database.

FIG. 2 illustrates an example process 200 for associating a policy 202, such as one of the policies 114, with an application, such as the application 108, and the data stored in a table 204 (e.g., data structure) of a PII database, such as the PII database 110. The table 204 may include a number of identifiers 206 associated with the data 208. The identifiers 206 may identify the type of data associated with the data 208. Each application 108 may include the same as well as different types of data. The policy 202 may include a deletion standard 210 that may include a non-exempt standard 212 and an exempt standard 214. The non-exempt standard 212 may be associated with data use types that are non-exempt from a deletion request. The exempt standard 214 may include data use types that are exempt from a deletion request. For example, the policy 202 may indicate that if a user makes a request to delete a certain type of data and the data is being used for a marketing campaign use type 216, then the data that the user requested to delete is non-exempt from the request and therefore must be deleted. In another example, the policy 202 may indicate that if a user makes a request to delete a certain type of data and the data is being used for a fraud detection use type 218, then the data that the user requested to delete is exempt from the request and therefore may not be deleted.

In some examples, each application 108 may include different use types associated with their respective data which may cause different actions performed on the data even when the same policy 202 is applied. For example, FIG. 2 show two use types (e.g., marketing campaign use type 216 and fraud detection use type 218). Other applications may include other use types such as billing, customer problem handling, etc. The policy 202 may indicate whether these other use types are associated with the non-exempt standard 212 or the exempt standard 214. By configuring the data stored in the PII databases 110 into tables, such as the table 204, and applying and/or associating a policy 202 with the table 204, the DSRM component 102 and/or the application 108 may automatically map to which portions of data must be deleted regardless of what the purpose or function of the application 108 relates to. This process can be scaled across hundreds of thousands of applications that a service provider may communicate with without requiring the service provider to delete data items from individual applications.

By limiting the number of transmissions used for providing access to and/or deleting data stored in the applications 108, the DSRM component 102 reduces the amount of traffic on a communication network thereby improving the efficiency of all computing devices participating in the communication network.

Example Signal Flow Diagram of Accessing and/or Deleting Data

FIGS. 3, 4, 7A, 7B, and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

Figure 3:
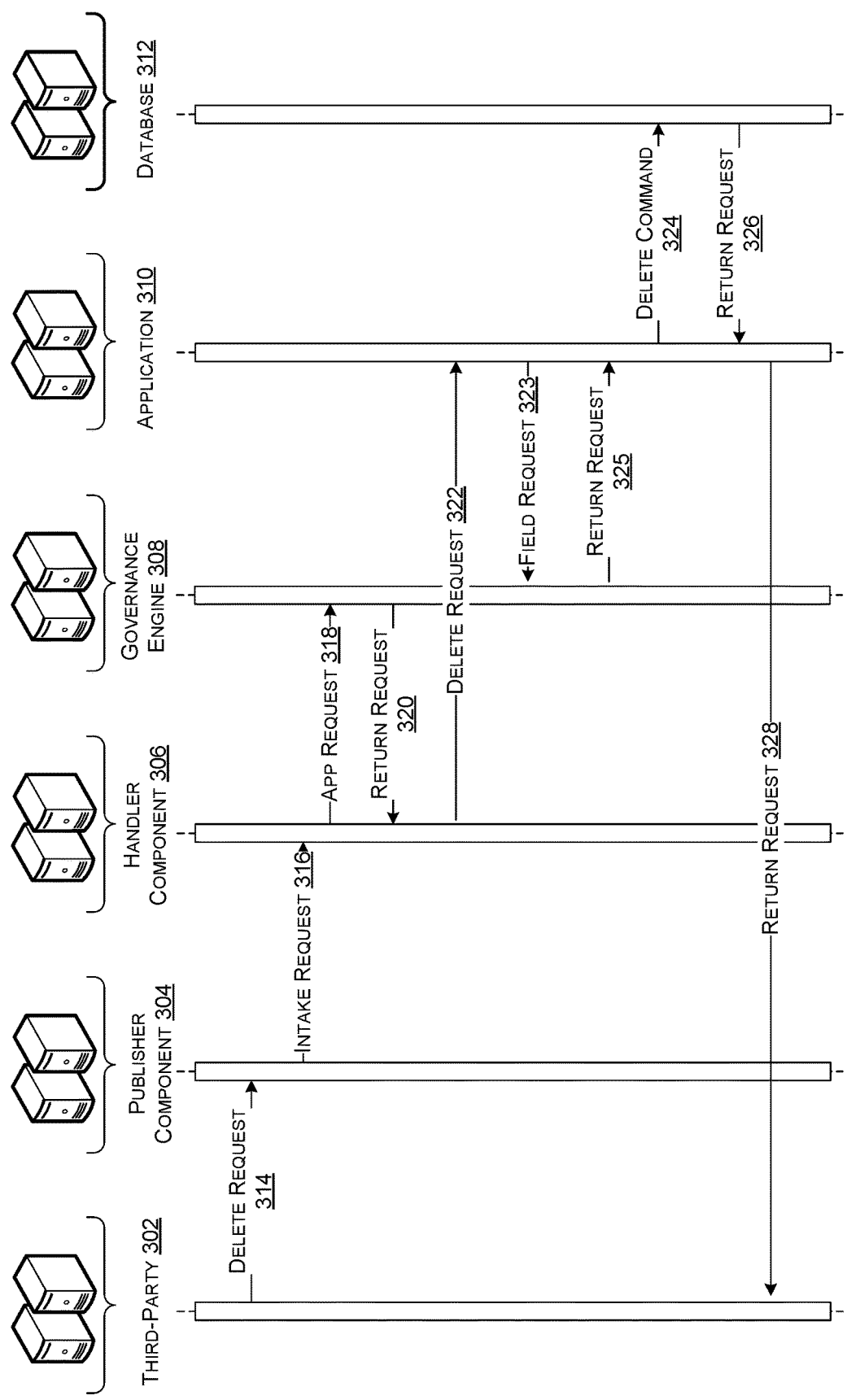
FIG. 3 shows a signal flow for a request to delete data according to the network architecture described herein.

FIG. 3 is a signal flow diagram which illustrates an example flow of operations 300 that may be used to delete data from a database. The example flow of operations 300 is described in the context of the example of architecture 100 and with reference to the devices illustrated in FIG. 1. However, the flow of operations 300 is not limited to use with the architecture 100 and devices of FIG. 1 and may be implemented using other architectures and devices. For example, the flow of operations may include a third-party computing device 302 that may operate the user interface system 106, a publisher component 304, a handler component 306, a governance engine 308, an application 310 (e.g., the same or similar to the application 108 and/or a service bus communicatively coupled between the DSRM component 102 and the application 108), and a database 312 (e.g., which may be the same or similar to the PII database 110). In some examples, the publisher component 304 and the handler component 306 may be sub-components of the DSRM component 102 while the governance engine 308 may be a sub-component of the policy management component 104. In some examples, the database 312 may include one of the PII databases 110 and the application 310 may include one of the applications 108.

The flow of operations 300 may begin, at operation 314, when the third-party computing device 302 sends a delete request 314 to the publisher component 304. For example, the publisher component 304 may be a service bus and may be a component of the DSRM component 102 configured to communicate with the third-party computing device 302 via an API, such as the APIs 118. In some examples, the delete request 314 includes an identifier of the user (e.g., user 112) making the request, a type of data to be deleted, and an action request (e.g., request to delete the data from the application).

At 316, the publisher component 304 may generate an intake request 316 and send the intake request 316 to the handler component 306. The intake request 316 may be a domain subscriber request that includes an identifier of the user (e.g., user 112) making the request, a type of data to be deleted, and an action request (e.g., request to delete the data from the application).

At 318, the handler component 306 may send an app request 318 to the governance engine 308 requesting identification information associated with any applications 108 that may include data identified in the delete request 314. The governance engine 308 may send a return request 320 (e.g., a list of applications) to the handler component 308 identifying the application 310 (e.g., applications 108) as storing data included in the delete request 314 and being associated with one or more policies, such as policies 114.

At 322, the handler component 306 may send a delete request 322 to the application 310. For example, based on the policies 114 associated with the applications 108, the handler component 306 may generate a map which identifies which data located in a particular table and/or column needs to be deleted. In some cases, the delete request 322 may be sent to a service bus and forwarded to the application 310.

At 323, the application 310 may send a field request 323 to the governance engine 308 and may receive a return request 325 in response. For example, the field request 323 may query the governance engine 308 regarding any policies, such as the policies 114 that may be associated with the application 310 storing the data included in the delete request 314. The governance engine 308 may provide a return request 325 to the application 310 which may identify any policies that are applicable to the application 310 and/or any data stored at the database 312.

At 324, the application 310 sends the delete command 324 to the database 312 causing the database 312 to delete the specified data indicated by the mapping request 322. For example, the application 310 may operate an API that may be accessed by the database 312. The delete command 324 may specify a user, such as the user 112, the data to be deleted, and a location (e.g., a table and/or a column) of the data to be deleted based on the policies 114 that are associated with the application 108 storing the database 312.

At 326, the database 312 may send a return request 326 to the application 310 confirming that the action indicated in the delete command 324 was performed and the application 310 may send a return request 328 to the third-party computing device 302 indicating what action was performed at the database 312 (e.g., deletion of data, error response, etc.).

Figure 4:
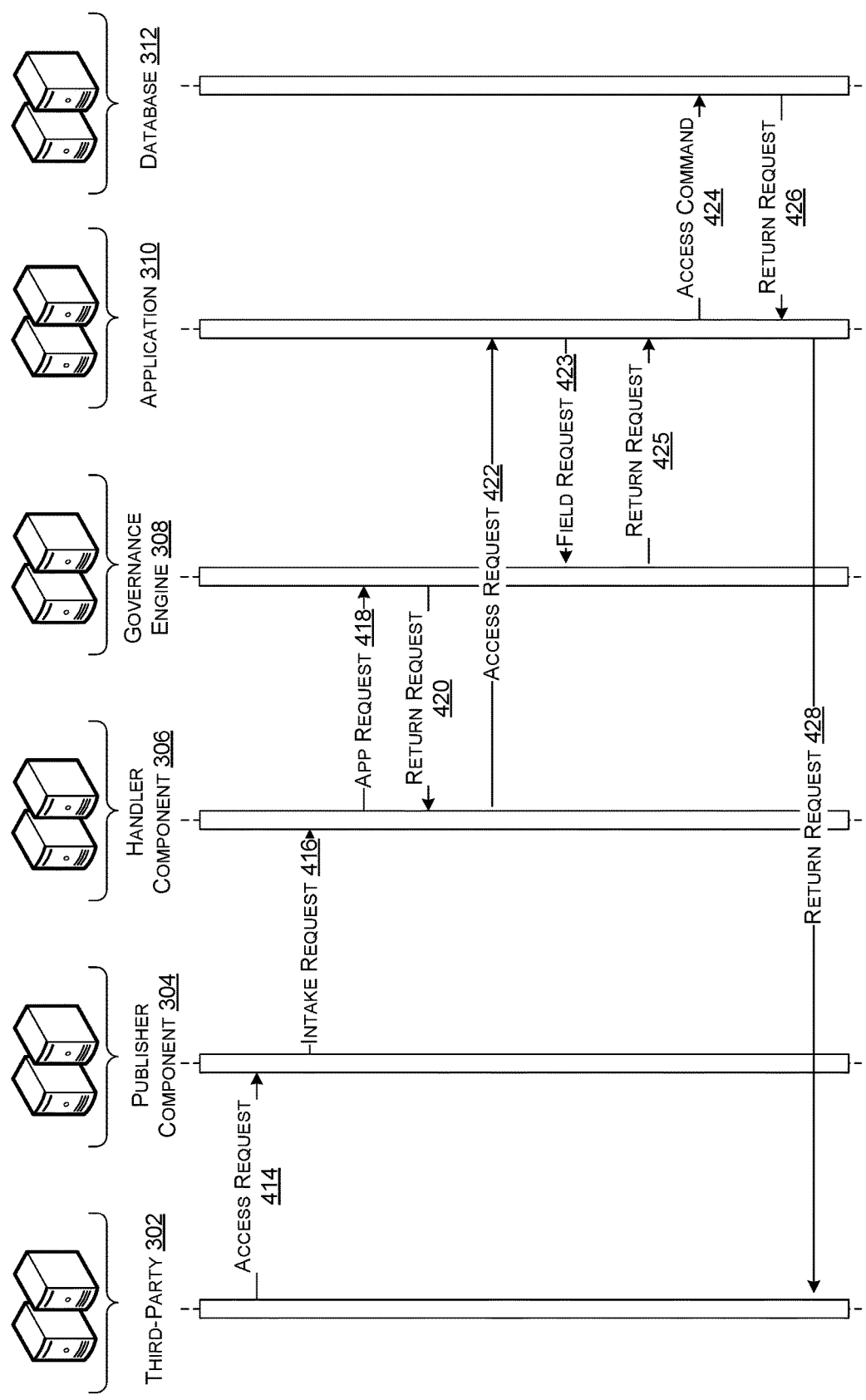
FIG. 4 shows a signal flow for a request to access data according to the network architecture described herein.

FIG. 4 is a signal flow diagram which illustrates an example flow of operations 400 that may be used to access data from a database. The example flow of operations 400 is described in the context of the example of architecture 100 and with reference to the devices illustrated in FIG. 1. However, the flow of operations 400 is not limited to use with the architecture 100 and devices of FIG. 1 and may be implemented using other architectures and devices. For example, the flow of operations may include a third-party computing device 302 that may operate the user interface system 106, a publisher component 304, a handler component 306, a governance engine 308, an application 310 (e.g., the same or similar to the application 108 and/or a service bus communicatively coupled between the DSRM component 102 and the application 108), and a database 312 (e.g., which may be the same or similar to the PII database 110). In some examples, the publisher component 304 and the handler component 306 may be sub-components of the DSRM component 102 while the governance engine 308 may be a sub-component of the policy management component 104. In some examples, the database 312 may include one of the PII databases 110 and the application 310 may include one of the applications 108.

The flow of operations 400 may begin, at operation 414, when the third-party computing device 302 sends an access request 414 to the publisher component 304. For example, the publisher component 304 may be a service bus and may be a component of the DSRM component 102 configured to communicate with the third-party computing device via an API, such as the APIs 118. In some examples, the access request 414 includes an identifier of the user (e.g., user 112) making the request, a type of data to be accessed, and an action request (e.g., request to access the data from the application).

At 416, the publisher component 304 may generate an intake request 416 and send the intake request 416 to the handler component 306. The intake request 416 may be a domain subscriber request that includes an identifier of the user (e.g., user 112) making the request, a type of data to be accessed, and an action request (e.g., request to access the data from the application).

At 418, the handler component 306 may send an app request 418 to the governance engine 308 requesting identification information associated with any applications 108 that may include data identified in the access request 414. The governance engine 308 may send a return request 420 (e.g., a list of applications) to the handler component 308 identifying the application 310 (e.g., applications 108) as storing data included in the access request 414 and being associated with one or more policies, such as policies 114.

At 422, the handler component 306 may send an access-request 422 to the application 310. For example, based on the policies 114 associated with the applications 108, the handler component 306 may generate a map which identifies which data located in a particular table and/or column needs to be accessed. In some cases, the access request 422 may be sent to a service bus and forwarded to the application 310.

At 423, the application 310 may send a field request 423 to the governance engine 308 and may receive a return request 425 in response. For example, the field request 423 may query the governance engine 308 regarding any policies, such as the policies 114 that may be associated with the application 310 storing the data included in the access request 414. The governance engine 308 may provide a return request 425 to the application 310 which may identify any policies that are applicable to the application 310 and/or any data stored at the database 312.

At 424, the application 310 sends the access command 424 to the database 312 causing the database 312 to access the specified data indicated by the mapping request 422. For example, the application 310 may operate an API that may be accessed by the database 312. The access command 424 may specify a user, such as the user 112, the data to be accessed, and a location (e.g., a table and/or a column) of the data to be accessed based on the policies 114 that are associated with the application 108 storing the database 312.

At 426, the database 312 may send a return request 426 to the application 310 confirming that the action indicated in the access command 424 was performed and the application 310 may send a return request 428 to the third-party computing device 302 indicating what action was performed at the database 312 (e.g., access of data, error response, etc.). In some cases, the return request 426 and/or the return request 428 may include data (e.g., payload of requested information) based on the data indicated in the access request 414. In some cases, the return request 426 and/or the return request 428 may be encrypted using JSON Web Encryption (JWE), and/or other encryption types to ensure the security of sensitive information being provided to the third-party 302.

Example DSRM Component 102

Figure 5:
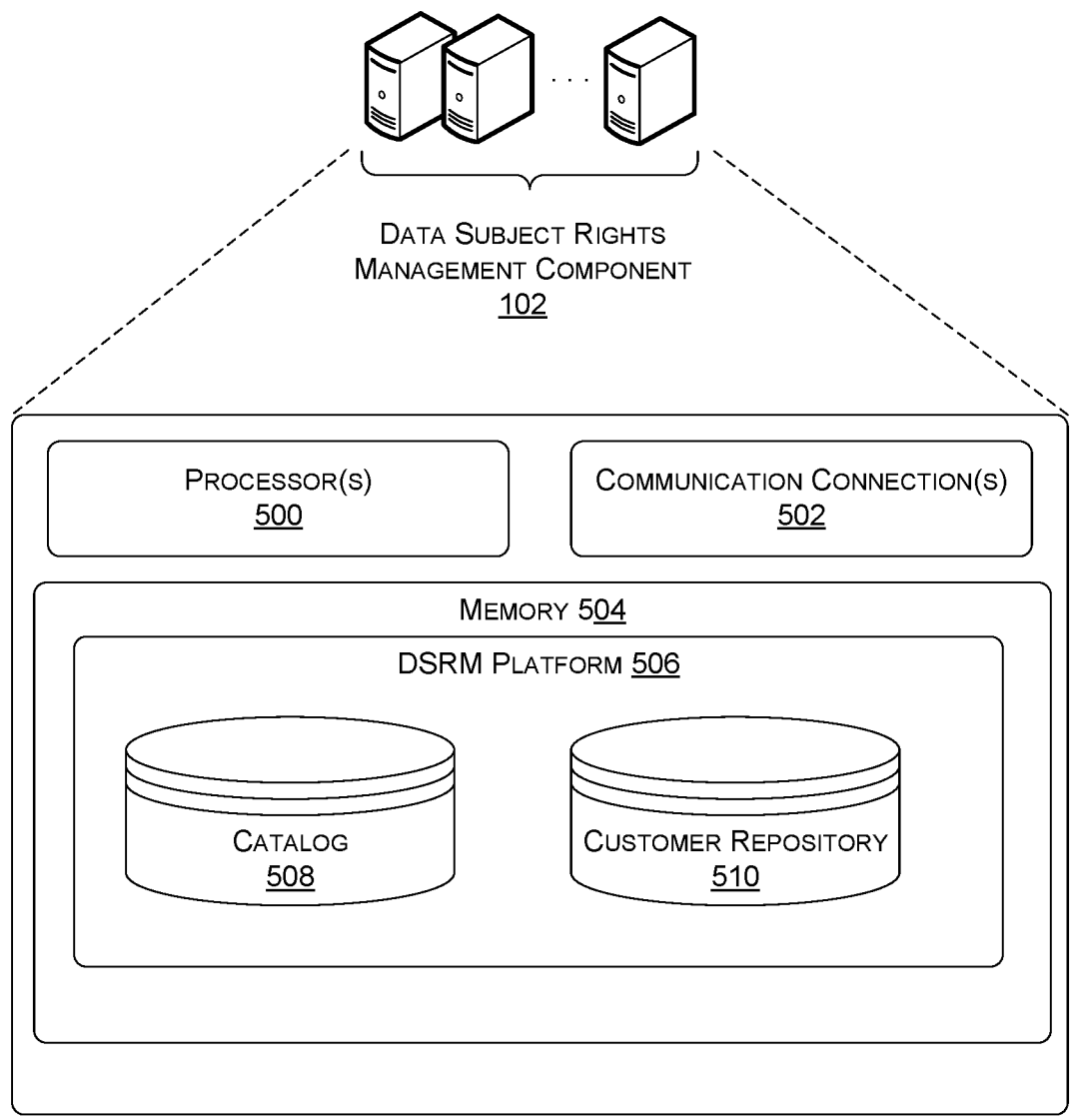
FIG. 5 is a block diagram illustrating details of an example of a computing device, the computing device being an example of one of the computing devices shown in FIG. 1.

FIG. 5 illustrates an example computing device, such as the DSRM component 102 of FIG. 1, in more detail. The DSRM component 102 may be configured as or disposed at a server, a cluster of servers, a server farm, a data center, a cloud computing resource, or any other computing resource capable of storing and/or providing access to a DSRM service. In some examples, the DSRM component 102 may be associated with an entity operating a telecommunication service, such as a manufacturer, vendor, supplier, or other third-party that provides, services, or administers at least a portion of a communication network. The DSRM component 102 may include one or more processors 500, one or more communication connections 502, and memory 504. The memory 504 may include a DSRM platform 506 storing a catalog 508 and a customer repository 510 and a plurality of components to implement various functions of the DSRM component 102. The communication connection 502 may include multiple APIs, such as APIs 118.

The catalog 508, which may be the same or similar to catalog 116, may store each application identifier associated with each application 108 and an indication of which policies 114 are associated with each application identifier. If a change to a policy 114 is made, then the DSRM component 102 may access the catalog 508 to determine which applications 108 need to be updated based on the policy change. In some examples, the catalog 508 stores processing activities associated with the data stored in each PII database 110 at the table-level. For example, the catalog 508 may store table information identifying the location (e.g., table and/or column) of types of data and what the data is being used for.

The customer repository 510, which may be the same or similar to the customer repository 120, may be accessed by the DSMR component 102 to verify that the user is a customer. In some cases, the customer repository 510 may indicate whether the user 112 is a former customer, a current customer, and/or a prospective customer. In some scenarios, the customer repository 510 may be part of the catalog 508 and the DSRM component 102 may access the catalog 508 to determine which applications 108 need to be accessed and/or updated based on the request. In some cases, the customer repository 510 may be an external component of the DRM component 102 and may be referenced as such.

The DSRM component 102 may also include one or more communication connections 502 to enable the DSRM component 102 to communicate with other computing devices locally or over a network. Examples of communication connections include, without limitation, power line communication (PLC) connections, Ethernet or other wired network connections, cellular communication connections, RF communication connections, or the like. As such, the DSRM component 102 also includes any ancillary hardware, modules, and/or interfaces associated with or needed for the operation of the particular communication connections.

Example Application 108

Figure 6:
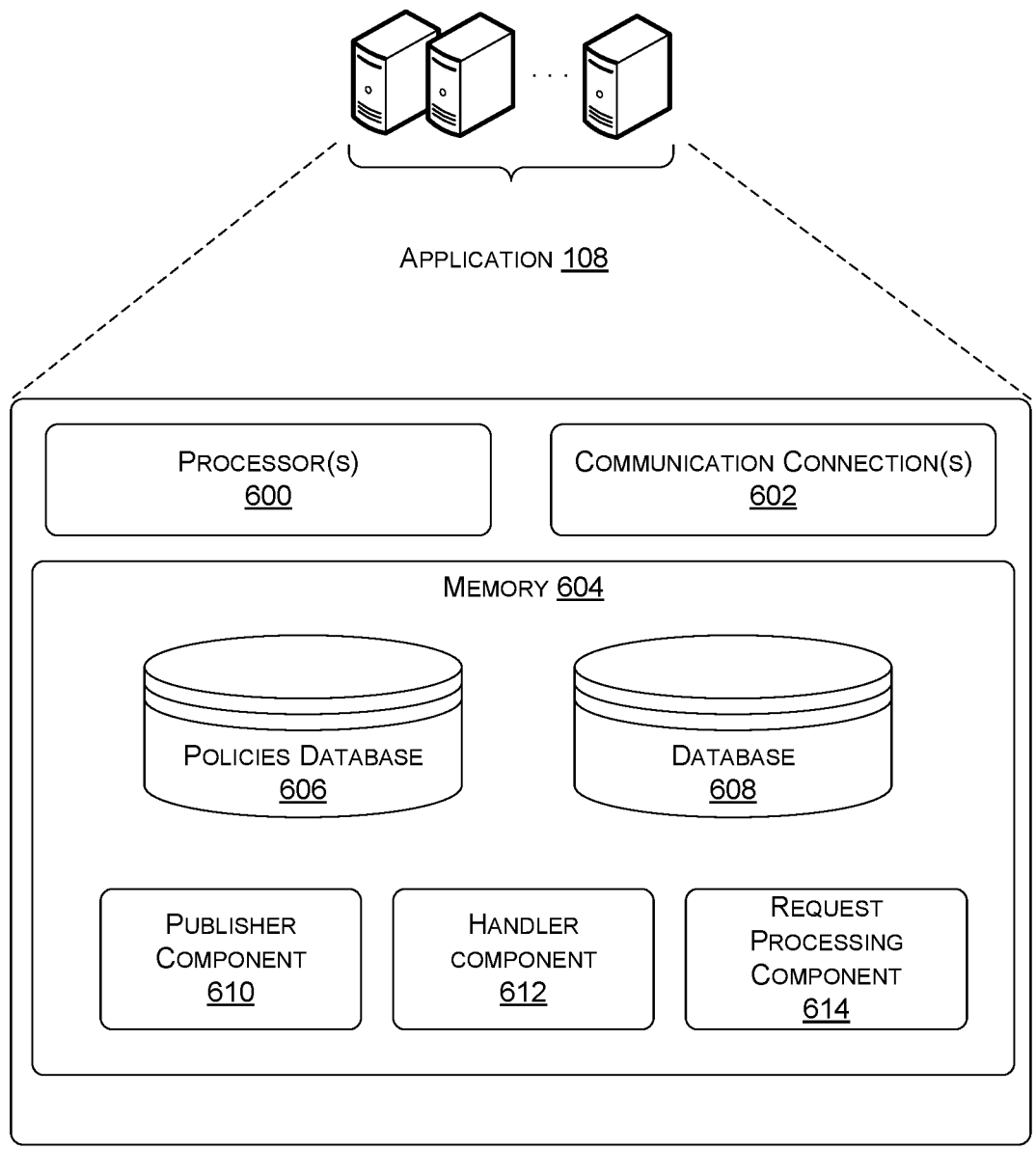
FIG. 6 is a block diagram illustrating details of another example of a computing device, the computing device being an example of one of the computing devices shown in FIG. 1.

FIG. 6 illustrates an example application 108 of FIG. 1 in more detail. The application 108 may be configured as or disposed at a server, a cluster of servers, a server farm, a data center, a cloud computing resource, or any other computing resource capable of storing and/or providing access to data. In some examples, the application 108 may be associated with an entity operating a telecommunication service, such as a manufacturer, vendor, supplier, or other third-party that provides, services, or administers at least a portion of a communication network. The application 108 may include one or more processors 600, one or more communication connections 602, and memory 604. The memory 604 may include a plurality of components to implement various functions of the application 108, such as a policies database 606 and a database 608 may be stored.

The policies database 606 may store a number of policies, such as the policies 114 and/or the policy 202, that may be applied to the application 108 and/or the data stored in the database 608. In some examples, the policies database 606 may not include the distributed parts of the policies 114 and/or the policy 202, but rather, are independent implementations. For example, a policy 202, such as one of the policies 114, with an application, such as the application 108, and the data stored in a table 204 of a PII database, such as the PII database 110. The table 204 may include a number of identifiers 206 associated with the data 208. The identifiers 206 may identify the type of data associated with the data 208. Each application 108 may include the same as well as different types of data. The policy 202 may include a deletion standard 210 that may include a non-exempt standard 212 and an exempt standard 214. The non-exempt standard 212 may be associated with data use types that are non-exempt from a deletion request. The exempt standard 214 may include data use types that are exempt from a deletion request. For example, a policy, such as policy 202, stored in the policies database 606 may indicate that if a user makes a request to delete a certain type of data and the data is being used for a particular purpose, then the data that the user requested to delete may be non-exempt or exempt from the request and therefore may or may not be deleted.

The database 608, which may be the same or similar to the PII databases 110, may store data associated with customers of a service provider and that is used by the application 108 to perform operations. For example, the data stored in the databases 608 may include, but is not limited to, any type of PII, such as identification number, driver's license number, address, birthdate, social security number, mobile phone type, location, fax number, name, Email, Mobile Station International Subscriber Directory Number (MSISDN), employer information, banking information, credit history, shopping history, etc.

A publisher component 610, which may be the same or similar to the publisher component 304, may be a service bus and may be a component of the application 108 configured to communicate with a third-party computing device via an API, such as the APIs 118. The publisher component 610 may receive data access requests and/or requests to delete certain types of data from the third-party computing and forward the requests to a handler component 612.

The handler component 612, which may be the same or similar to handler component 306, may send an app request 318 to the governance engine 308 and may receive a return request 320 in response.

A processing request component 614 may send the delete command 324 and/or the access command 424 to the database 312 causing the database 312 to delete and/or access the specified data indicated by the request 314/414.

Memories 504 and 604 are shown to include software functionality configured as one or more "components." However, the components are intended to represent example divisions of the software for purposes of discussion and are not intended to represent any type of requirement or required method, manner or necessary organization. Accordingly, while various "components" are discussed, their functionality and/or similar functionality could be arranged differently (e.g., combined into a fewer number of modules, broken into a larger number of modules, etc.).

While detailed examples of certain computing devices (e.g., the DSRM component 102 and the application 108) are described above, it should be understood that even those computing devices not described in detail may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

The various memories described herein are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Method

Figure 7A:
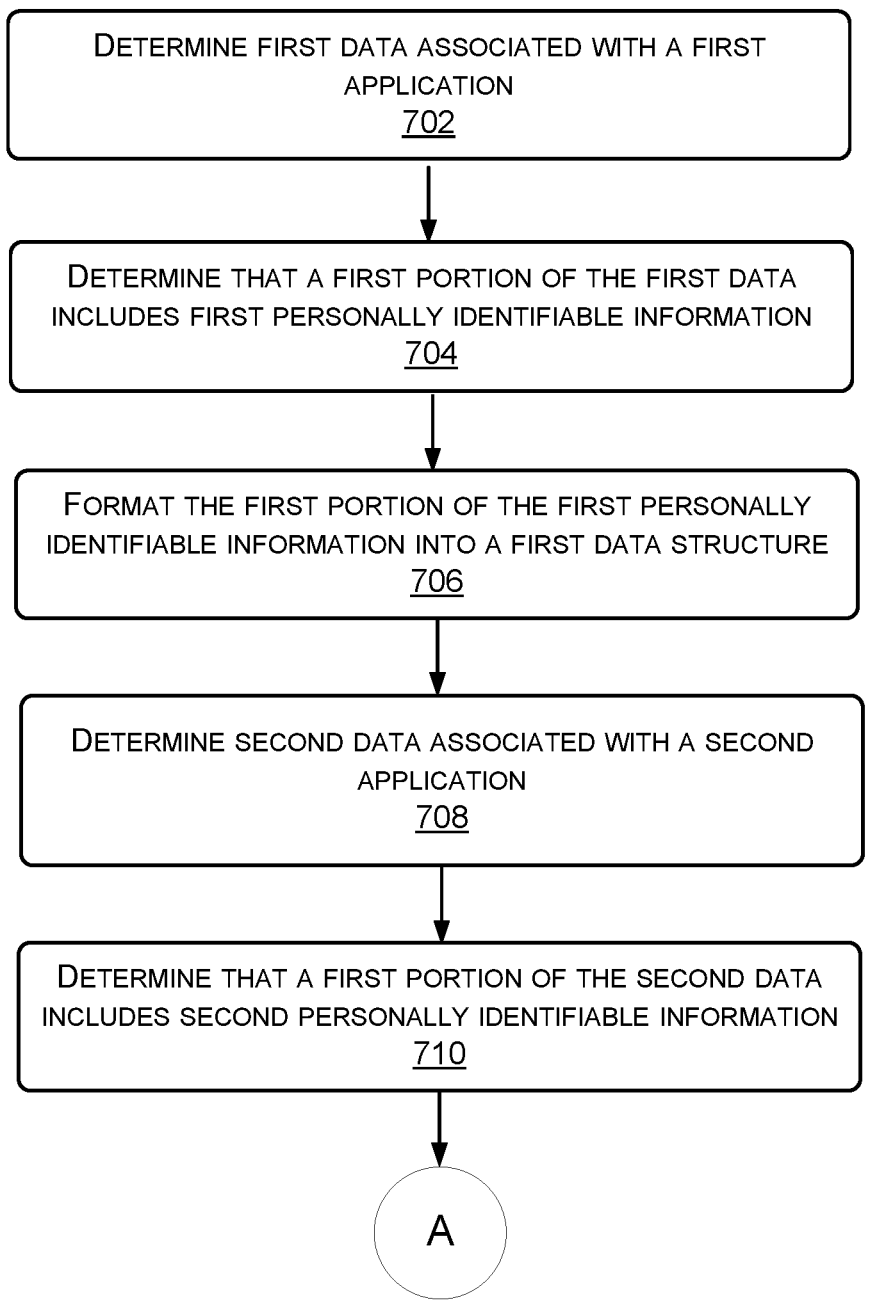
FIGS. 7A and 7B show a flowchart of an example method that may be implemented by a computing device to facilitate management of data stored by one or more applications.
Figure 7B:
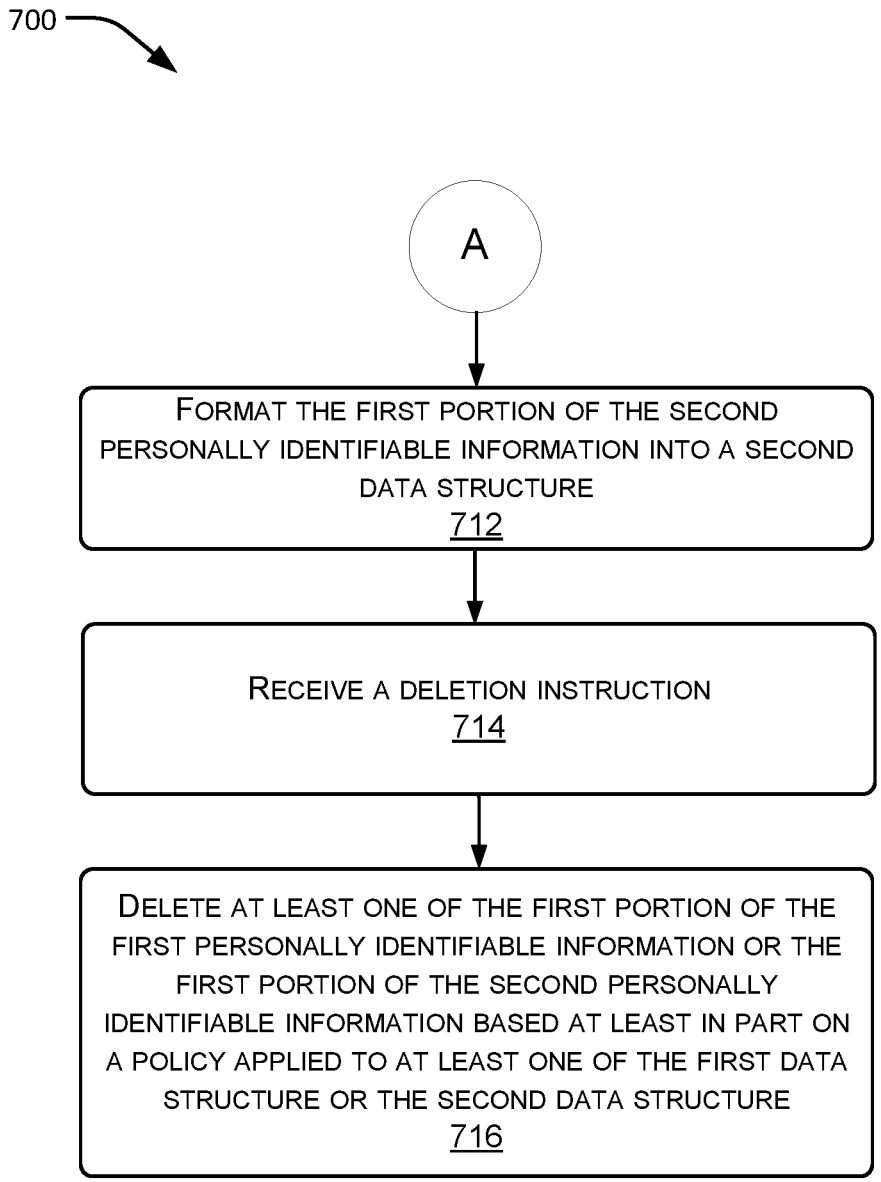

FIGS. 7A and 7B are flowcharts which illustrate an example flow of operations 700 that may be performed by a first computing device, such as the DSRM component 102, to delete data stored by one or more applications, within the context of the example of architecture 100 and with reference to the devices illustrated in FIG. 1. However, the flow of operations 700 is not limited to use with the architecture 100 and devices of FIG. 1 and may be implemented using other architectures and devices.

The flow of operations 700 may begin, at block 702, with a computing device determining first data associated with a first application. In one example, the DSRM component 102 and/or the policy management component 104 may onboard the application 108 and identify data, such as PII, stored by the PII database 110. The data may be organized by type of data and/or a use type associated with the data based on how the application 108 uses the data.

At 704, the computing device may determine that a first portion of the first data includes first personally identifiable information. In one example, the data stored in the PII databases 110 may include, but is not limited to, any type of PII, such as identification number, driver's license number, address, birthdate, social security number, mobile phone type, location, fax number, name, Email, Mobile Station International Subscriber Directory Number (MSISDN), employer information, banking information, credit history, shopping history, etc.

At 706, the computing device may format the first portion of the first personally identifiable information into a first data structure. In one example, the DSRM component 102 and/or the policy management component 104 may inventory the data stored by an application 108 into tables and columns that may be mapped by the DSRM component 102. The tables and columns may organize the data by data type and by use type.

At 708, the computing device may determine second data associated with a second application. For example, the DSRM component 102 and/or the policy management component 104 may communicate with multiple applications 108 each storing different (or the same) types of data and using the data for different purposes. The DSRM component 102 and/or the policy management component 104 may onboard each of the applications 108 and identify data, such as PII, stored by the PII databases 110 associated with each of the applications 108. In some cases, the first data may be the same as the second data but may be associated with different use types. For example, the first application may use the first data for a first use type while the second application uses the second data (which may be the same as the first data) for a second use type that is different than the first use type.

At 710, the computing device may determine that a first portion of the second data includes second personally identifiable information. For example, each application 108 may store data, via the PII databases 110, associated with a number of users, such as the user 112. The data may be the same in some cases and may be different in some cases. In some cases, the data may be the same, but the application 108 may be using the data for a different use type then the application 108(1) and/or 108(2).

At 712, the computing device may format the first portion of the second personally identifiable information into a second data structure. In one example, the DSRM component 102 and/or the policy management component 104 may inventory the data stored by an application 108 into tables and columns that may be mapped by the DSRM component 102. The tables and columns may organize the data by data type and by use type.

At 714, the computing device may receive a deletion instruction. In one example, the DSRM component 102 may receive a request to access and/or delete data stored by an application 108. The request may be sent from a third-party resource that provides tools, such as the user interface system 106, to the user 112 attempting to access and/or delete the data. For example, the third-party resource may interface with the DSRM component 102 via an application programming interface (API) 118. The third-party resource may send a request to the DSRM component 102, via the API 118, that includes an identifier of the user 112 making the request, a type of data to be accessed and/or deleted, and an action request (e.g., request to access the data and/or a request to delete the data from the application). In some examples, the DSRM component 102 may access a customer repository 120 to verify that the user is a customer. In some cases, the customer repository 120 may indicate whether the user 112 is a former customer, a current customer, and/or a prospective customer. In some scenarios the DSRM component 102 may access the catalog 116 to determine which applications 108 need to be accessed and/or updated based on the request.

At 716, the computing device may delete at least one of the first portion of the first personally identifiable information or the first portion of the second personally identifiable information based at least in part on a policy applied to at least one of the first data structure or the second data structure. In one example, the request may indicate a particular type of data that the user 112 desires to have access to or to be deleted. The catalog 116 may store a list of application identifiers identifying the applications 108 that are associated with the policies 114 as well as an indication of what types of data (e.g., a data type) are being stored by the application 108 and what the data is being used for (e.g., a use type). The DSRM component 102 may determine if the type of data included in the request and the user identification corresponds to one of the application identifiers stored in the catalog 116. In some examples, the DSRM component 102 may identify a column and/or table of the PII database 110 storing the type of data included in the request. In some examples, the application 108 may access the DSRM component 102 via the APIs 118 and determine that the DSRM component 102 includes an indication that a particular type of data needs to be deleted and/or a particular type of data being used for a particular use type needs to be deleted based on one or more policies associated with the application 108.

In some examples, once a PII database associated with an application 108 is identified as storing the type of data included in the request and/or the column and/or table of the PII database 110 is identified as storing the type of data included in the request, the DSRM component 102 may send a message to the application 108 causing the application 108 to delete the data and/or return the data as a response to an access request. In some cases, the message to the application 108 identifies the type of data to delete and the location of the data within a table (e.g., the column). In some cases, the message may be sent to multiple different applications 108 that each store the type of data indicated in the request. For example, the DSRM component 102 may enable the API(s) 118 to be accessible to a number of different applications 108 that each store data associated with one or more users 112. The applications 108 may each communicate with the DSRM component 102 via the API(s) 118 to receive messages that cause the applications 108 to provide access to types of data and/or to delete types of data based on the user request and the policy 114 associated with each application 108.

Figure 8:
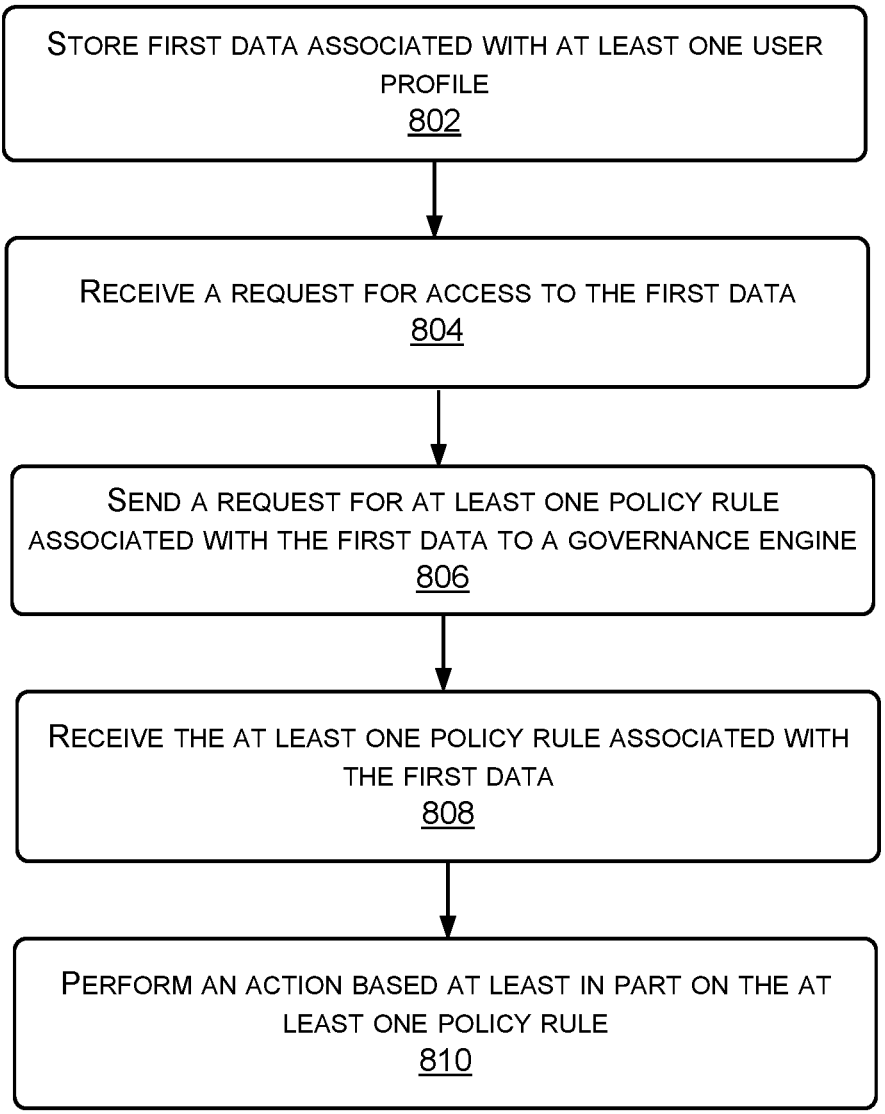
FIG. 8 show a flowchart of an example method that may be implemented by an application to provide access to data stored by the application.

FIG. 8 is a flowchart which illustrates an example flow of operations 800 that may be performed by an applications, such as the application 108, to perform an action based on a policy, within the context of the example of architecture 100 and with reference to the devices illustrated in FIG. 1. However, the flow of operations 800 is not limited to use with the architecture 100 and devices of FIG. 1 and may be implemented using other architectures and devices.

The flow of operations 800 may begin at block 802, with a database associated with an application storing first data associated with at least one user profile. In one example, PII databases 110 associated with applications 108 operated by or in communicating with a service provider, such as a telecommunications service that operates the DSRM component 102, may store data associated with customers, such as a user 112. The data stored in the PII databases 110 may include, but is not limited to, any type of PII, such as identification number, driver's license number, address, birthdate, social security number, mobile phone type, location, fax number, name, Email, Mobile Station International Subscriber Directory Number (MSISDN), employer information, banking information, credit history, shopping history, etc.

At 804, the application may receive a request for access to the first data. In one example, the DSRM component 102 may receive a request to access and/or delete data stored by an application 108. The request may be sent from a third-party resource that provides tools, such as the user interface system 106, to the user 112 attempting to access and/or delete the data. For example, the third-party resource may interface with the DSRM component 102 via an application programming interface (API) 118. The third-party resource may send a request to the DSRM component 102, via the API 118, that includes an identifier of the user 112 making the request, a type of data to be accessed and/or deleted, and an action request (e.g., request to access the data and/or a request to delete the data from the application). The DSRM component 102 may send the request for access to the application 108.

At 806, the application may send a request for at least one policy rule associated with the first data to a computing device. In one example, the application 108 may be associated with one of the policies 114 and the application may communicate with the policy management component 104 to determine which policy 114 applies to the data stored by the application 108 and the data identified in the access request. For example, the application 108 may determine which fields storing the data are subject to the policy 114 and may determine which action to take based on the policy rules included in the policy 114.

At 808, the application may receive information associated with the at least one policy rule associated with the first data. In one example, the policy management component 104 may associate an application identifier that identifies the application 108 with a particular policy 114 based on the PII database 110 storing data associated with the policy 114. For example, the DSRM component 102 and/or the policy management component 104 may store a catalog 116 that includes each application identifier associated with each application 108 and which policies 114 are associated with each application identifier. In some cases, the information associated with the at least one policy rule may include results of a field list to which the policy has been applied. The results may identify the field of the PII database 110 in which the data needs to be deleted and/or accessed.

At 810, the application may perform an action based at least in part on the at least one policy rule. In one example, the DSRM component 102 may enable the API(s) 118 to be accessible to a number of different applications 108 that each store data associated with one or more users 112. The applications 108 may each communicate with the DSRM component 102 via the API(s) 118 to receive messages that cause the applications 108 to provide access to types of data and/or to delete types of data based on the user request and the policy 114 associated with each application 108.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A system comprising:
   one or more processors; and
   non-transitory computer readable media storing computer readable instructions that, when executed, cause the one or more processors to perform operations comprising:
      determining first data associated with a first application;
      determining that a first portion of the first data includes first personally identifiable information;
      formatting the first portion of the first personally identifiable information into a first data structure;
      determining second data associated with a second application;
      determining that a first portion of the second data includes second personally identifiable information;
      formatting the first portion of the second personally identifiable information into a second data structure;
      receiving a deletion instruction; and
      sending a delete instruction to the first application to cause the first application to delete the first portion of the first personally identifiable information based at least in part on a policy applied to at least one of the first data structure, wherein the first portion of the first personally identifiable information is not available to the first application after its deletion.

2. The system of claim 1, the operations further comprising, in response to receiving the deletion instruction:
   accessing a catalog that stores a plurality of application identifiers;
   identifying at least one of the first application or the second application based at least in part on a first application identifier of the plurality of application identifiers; and
   determining that the policy is associated with the first application identifier.

3. The system of claim 2, the operations further comprising applying at least one policy rule of the policy to at least one of the first application.

4. The system of claim 3, wherein the at least one policy rule defines a first use type of data as being non-exempt from a deletion request and a second use type of data as being exempt from the deletion request.

5. The system of claim 4, wherein the first portion of the first personally identifiable information is associated with the first use type and the first portion of the second personally identifiable information is associated with the second use type.

6. The system of claim 5, further comprising deleting the first portion of the first personally identifiable information in response to being associated with the first use type and refraining from deleting the first portion of the second personally identifiable information in response to being associated with the second use type.

7. The system of claim 1, wherein sending the delete instruction to the first application includes sending the delete instruction via an application programming interface (API).

8. A method performed by a computing device comprising:
   determining first data associated with a first application;
   determining that a first portion of the first data includes first personally identifiable information;
   formatting the first portion of the first personally identifiable information into a first data structure;
   determining second data associated with a second application;
   determining that a first portion of the second data includes second personally identifiable information;
   formatting the first portion of the second personally identifiable information into a second data structure;
   receiving a request instruction; and
   sending a delete instruction to the first application to cause the first application to delete the first data structure based on a first policy associated with the first data structure, wherein the first portion of the first personally identifiable information is not available to the first application after deletion of the first data structure.

9. The method of claim 8, wherein the request instruction includes at least a data deletion request.

10. The method of claim 8, further comprising applying a first policy rule of the first policy to the first data structure and applying a second policy rule of a second policy to the second data structure.

11. The method of claim 10, wherein the first policy rule defines a first use type of data as being non-exempt from a deletion request and the second policy rule defines a second use type of data as being exempt from the deletion request.

12. The method of claim 11, wherein the first portion of the first personally identifiable information is associated with the first use type and the first portion of the second personally identifiable information is associated with the second use type.

13. The method of claim 12, further comprising deleting the first portion of the first personally identifiable information in response to being associated with the first use type and refraining from deleting the first portion of the second personally identifiable information in response to being associated with the second use type.

14. One or more non-transitory computer-readable media storing computer executable instructions that, when executed by one or more processors, cause the one or more processors to perform operations comprising:
   determining first data associated with a first application;
   determining that a first portion of the first data includes first personally identifiable information;
   formatting the first portion of the first personally identifiable information into a first data structure;
   determining second data associated with a second application;
   determining that a first portion of the second data includes second personally identifiable information;
   formatting the first portion of the second personally identifiable information into a second data structure;
   receiving a request instruction; and
   sending a delete instruction to the first application to cause the first application to delete the first data structure based on a first policy associated with the first data structure, wherein the first portion of the first personally identifiable information is not available to the first application after deletion of the first data structure.

15. The one or more non-transitory computer-readable media of claim 14, wherein the request instruction includes at least a data deletion request.

16. The one or more non-transitory computer-readable media of claim 14, further comprising applying a first policy rule of the first policy to the first data structure and applying a second policy rule of a second policy to the second data structure.

17. The one or more non-transitory computer-readable media of claim 16, wherein the first policy rule defines a first use type of data as being non-exempt from a deletion request and the second policy rule defines a second use type of data as being exempt from the deletion request.

18. The one or more non-transitory computer-readable media of claim 17, wherein the first portion of the first personally identifiable information is associated with the first use type and the first portion of the second personally identifiable information is associated with the second use type.

19. The one or more non-transitory computer-readable media of claim 18, further comprising deleting the first portion of the first personally identifiable information in response to being associated with the first use type and refraining from deleting the first portion of the second personally identifiable information in response to being associated with the second use type.

20. The one or more non-transitory computer-readable media of claim 14, wherein sending the delete instruction to the first application includes sending the delete instruction via an application programming interface (API).

* * * * *